No. 715,644. Patented Dec. 9, 1902.
J. L. DINKELSPIEL.
FASTENER FOR GARMENTS, &c.
(Application filed Feb. 19, 1902.)
(No Model.)
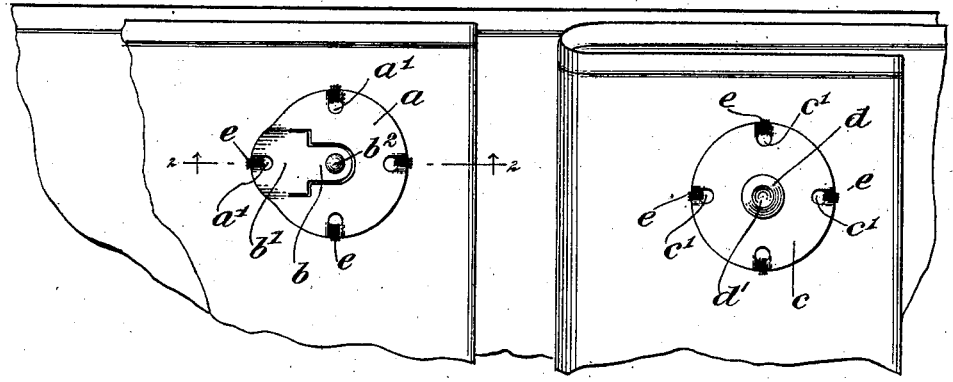
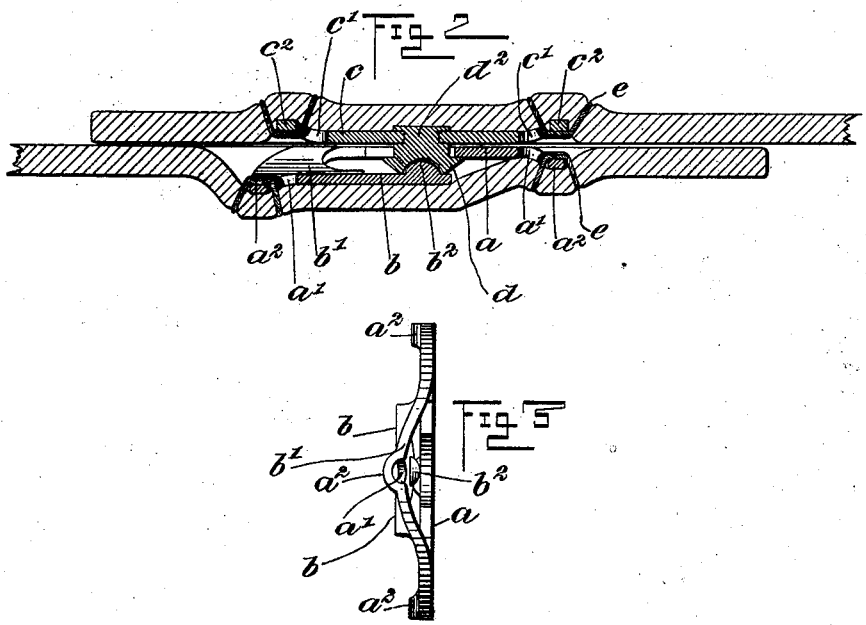
WITNESSES:
INVENTOR
Joseph L. Dinkelspiel
BY
ATTORNEYS

UNITED STATES PATENT OFFICE.

JOSEPH L. DINKELSPIEL, OF NEW YORK, N. Y.

FASTENER FOR GARMENTS, &c.

SPECIFICATION forming part of Letters Patent No. 715,644, dated December 9, 1902.

Application filed February 19, 1902. Serial No. 94,766. (No model.)

*To all whom it may concern:*

Be it known that I, JOSEPH L. DINKELSPIEL, a citizen of the United States, and a resident of the city of New York, borough of Manhattan, in the county and State of New York, have invented a new and Improved Fastener for Garments and other Articles, of which the following is a full, clear, and exact description.

This invention relates to a device for fastening together the parts of a garment or other structure of cloth, leather, or other material. It relates to certain improvements in the construction forming the subject-matter of Letters Patent granted to Carrie P. Parker, No. 637,524, dated November 21, 1899.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a view showing the engaging sides of the two parts of the fastener. Fig. 2 is an enlarged section on the line 2 2 of Fig. 1, the parts of the fastener being in engagement; and Fig. 3 is an edge view of the socket-plate of the fastener.

The socket member of the fastener comprises a plate $a$, which is preferably circular and in which is stamped the tongue $b$, said tongue lying downward from the plane of the plate and being joined to the plate at its base by means of a downwardly-swaged or indented section of metal $b'$. This swaged or indented part $b'$ lies, as shown in Fig. 2, essentially in the plane of the tongue, and its purpose will be hereinafter pointed out. The tongue $b$ is formed with a slight enlargement or teat $b^2$ on its upper surface, as shown.

The stud member of the fastener comprises a flat plate $c$, preferably circular, like the plate $a$, and carrying the stud $d$ centrally or otherwise of the plate $c$. This stud has a frusto-conical head terminating in a cavity $d'$. In constructing the fastener the stud is formed separate from the plate $c$ and has its shank passed through the plate $c$ and upset or riveted thereon, as shown at $d^2$ in Fig. 2. By this arrangement the stud may be inexpensively constructed and given exactly the proper shape before applying it to the fastener.

In engaging the parts of the fastener the two sections of the garment to which they are secured may be laid flat against each other, as shown in Fig. 2, and moved edgewise in parallel planes, so as to enter the stud $d$ through the space left by the depressed or swaged portion $b'$ and slide the stud along the tongue into the end of the slot or socket in the plate $a$. It will be observed that this swaged or depressed portion $b'$ greatly facilitates the engagement and disengagement of the fastener parts, since it does not involve the movement of the parts toward and from each other in the direction of the axis of the stud, but requires merely a sidewise movement of the stud toward the socket plate or section $a$, so as to cause the stud to slide over the tongue and to enter the teat $b^2$ into the cavity $d'$ of the stud, thus locking the head of the stud firmly under the plate $a$, with the shank projected through the contracted portion of the slot in the socket member $a$. The sections of the fastener are secured to the parts of the garment by means of threads $e$, and these threads are engaged in eyes $a'$ and $c'$, formed in the members or plates $a$ and $c$, adjacent to the peripheries thereof. The members or plates $a$ and $c$ are formed with plane engaging faces and are adapted to lie snugly engaged, as in Fig. 2. Now in order to prevent the threads $e$ from being chafed and worn by the engaging surfaces and also in order to allow these sections to lie snugly together without obstruction, I swage down the sections of metal intervening the eyes $c'$ and $a'$ and the edges of the fastener-section, as indicated at $a^2$ and $c^2$, respectively. These oppositely-swaged portions (see Fig. 2) lie out of the plane of the bodies of the plates or sections of the fastener and allow the threads to lie within or beyond the planes of the engaging faces of the parts $a$ and $c$. It therefore follows that the sections of the fastener may be snugly engaged together without in any way injuring the threads which secure them and also without forming a cumbersome connection.

It will be observed that one of the eyes $a'$ of the section $a$ is located directly at the swaged or indented portion $b'$ of the socket-section. This securely fastens the socket-section to the cloth at the point where the stud $d$ first enters the socket section or member. In the absence of these indentations the stud is liable to hook under the socket piece or plate and thus prevent the proper engagement of the parts and finally to tear them away from the garment. However, by securing the socket member directly at the point in question it is impossible for the stud to hook under the socket member and the stud must necessarily slide over the same. This feature, combined with the swaged or depressed part $b'$ at the base of the tongue $b$, insures the rapid and effective movement of the two parts of the fastener. The eye $a'$ at the depressed or swaged part $b'$ is, as before described, arranged with an offset section of metal $a^2$, so that the threads at this particular point are placed out of the possibility of being engaged by the stud, and thus the threads are prevented from being worn away.

Various changes in the form and details of my invention may be resorted to at will without departing from the spirit of my invention. Hence I consider myself entitled to all changes as may lie within the intent of my claims.

Having thus described my invention, I claim as new and desire to secure by Letters Patent—

1. A fastener for garments and other articles, said fastener comprising a socket member, and a stud member, the socket member being formed of a plate having a tongue stamped therein, said tongue lying downward from the plane of the plate and being joined to the plate at the base of the tongue by means of a downwardly-swaged or indented part such as $b'$ for the purpose specified.

2. A fastener for garments and other articles, said fastener comprising a socket member and a stud member, the socket member being formed of a plate having a tongue stamped therein, said tongue lying downward from the plane of the plate and being joined to the plate at the base of the tongue by means of a downwardly-swaged or indented portion such as $b'$ for the purpose specified, the said tongue being formed with an enlargement or teat on its upper surface, and the stud member comprising a plate and a stud carried thereon and having a head terminating in a cavity to receive the teat of the tongue of the socket member.

3. A fastener for garments and other articles, said fastener comprising a socket member and a stud member, the socket member being formed of a plate having a tongue stamped therein, said tongue lying downward from the plane of the plate and being joined to the plate at the base of the tongue by means of a downwardly-swaged or indented part, such as $b'$, for the purpose specified, the stud member comprising a plate and a stud carried thereon, and the plates of the socket and stud members being formed with eyes to receive the means for securing the fastener members to the garment, the sections of metal in the said plates of the socket and stud members being swaged down intervening the eyes and the peripheral edges of the plates, for the purpose specified.

In testimony whereof I have signed my name to this specification in the presence of two subscribing witnesses.

JOSEPH L. DINKELSPIEL.

Witnesses:
I. B. OWENS,
JNO. M. RITTER.